US005662973A

United States Patent [19]

Weder

[11] Patent Number: 5,662,973
[45] Date of Patent: *Sep. 2, 1997

[54] VASE FOR CONTAINING A FLORAL GROUPING

[75] Inventor: Donald E. Weder, Highland, Ill.

[73] Assignee: Southpac Trust International, Inc.; not individually, but as trustee of The Family Trust U/T/A dated December 8, 1995, Charles A. Codding, Authorized Signatory for Southpac Trust International, Inc. trustee

[*] Notice: The term of this patent shall not extend beyond the expiration date of Pat. No. 4,773,182.

[21] Appl. No.: 242,583

[22] Filed: May 13, 1994

Related U.S. Application Data

[63] Continuation-in-part of Ser. No. 108,093, Aug. 17, 1993, Pat. No. 5,472,752, which is a continuation of Ser. No. 24,573, Mar. 1, 1993, abandoned, which is a continuation of Ser. No. 464,694, Jan. 16, 1990, Pat. No. 5,208,027, which is a continuation of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 19, 1984, abandoned, said Ser. No. 242,583, May 13, 1994, and a continuation-in-part of Ser. No. 868,821, Apr. 14, 1992, Pat. No. 5,254,072, which is a continuation of Ser. No. 736,348, Jul. 26, 1991, Pat. No. 5,127,817.

[51] Int. Cl.$^6$ .................................. B29D 23/00
[52] U.S. Cl. .................. 428/36.9; 428/36.91; 428/36.92
[58] Field of Search .................. 428/34.1, 35.8, 428/36.9, 36.91, 36.92; 47/66, 72; 206/44 K, 44 B, 423, 499

[56] References Cited

U.S. PATENT DOCUMENTS 4,773,182  9/1988  Weder et al. .......................... 47/72

FOREIGN PATENT DOCUMENTS 2589436  5/1987  France .

Primary Examiner—James J. Seidleck
Assistant Examiner—Michael A. Williamson
Attorney, Agent, or Firm—Dunlap & Codding, P.C.

[57] ABSTRACT

A container for holding a floral grouping. The most generally a vase, is formed from a sheet of material and has an outer peripheral wall which extends from the closed lower end to the open upper end. The peripheral wall comprises a plurality of folds in the sheet of material with adjacent portions of at least some of the folds being connected via a bonding material to form connected folds, which connected folds cooperate to maintain the vase in the shape of a vase. The container preferably has a bonding material disposed on a portion of the bottom surface of the vase for enabling the vase to be bondingly connected to a surface in a vertical orientation.

48 Claims, 3 Drawing Sheets

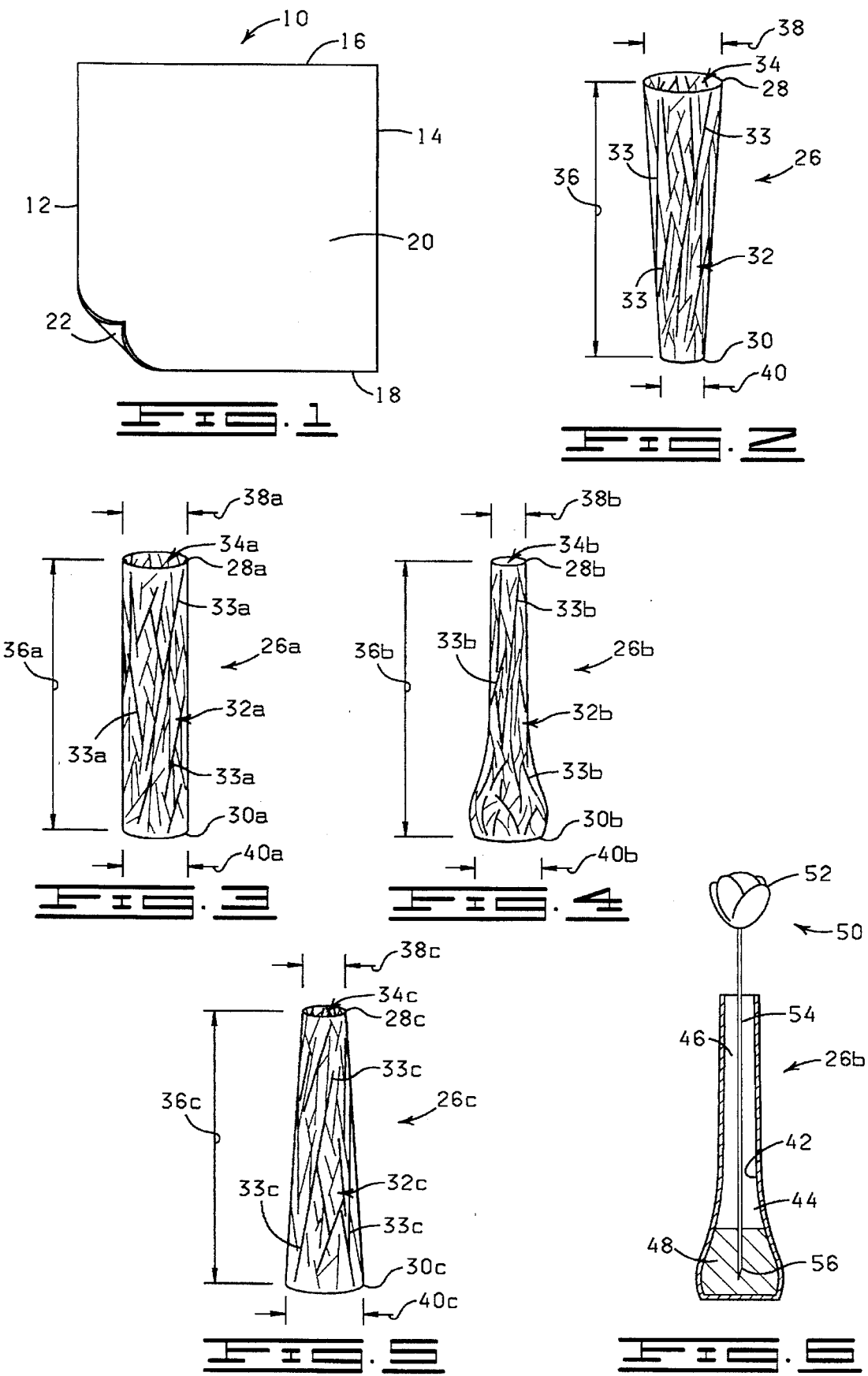

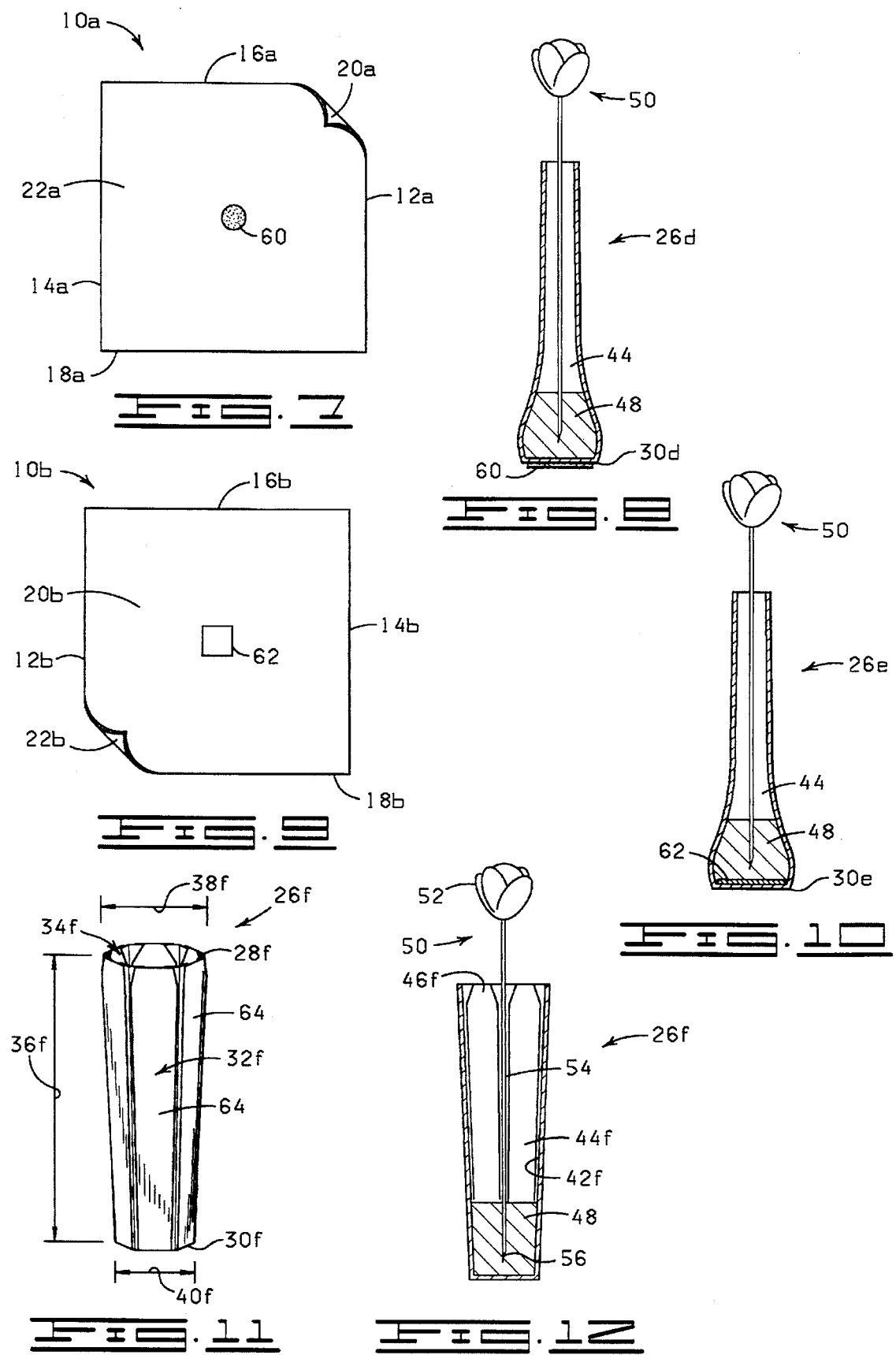

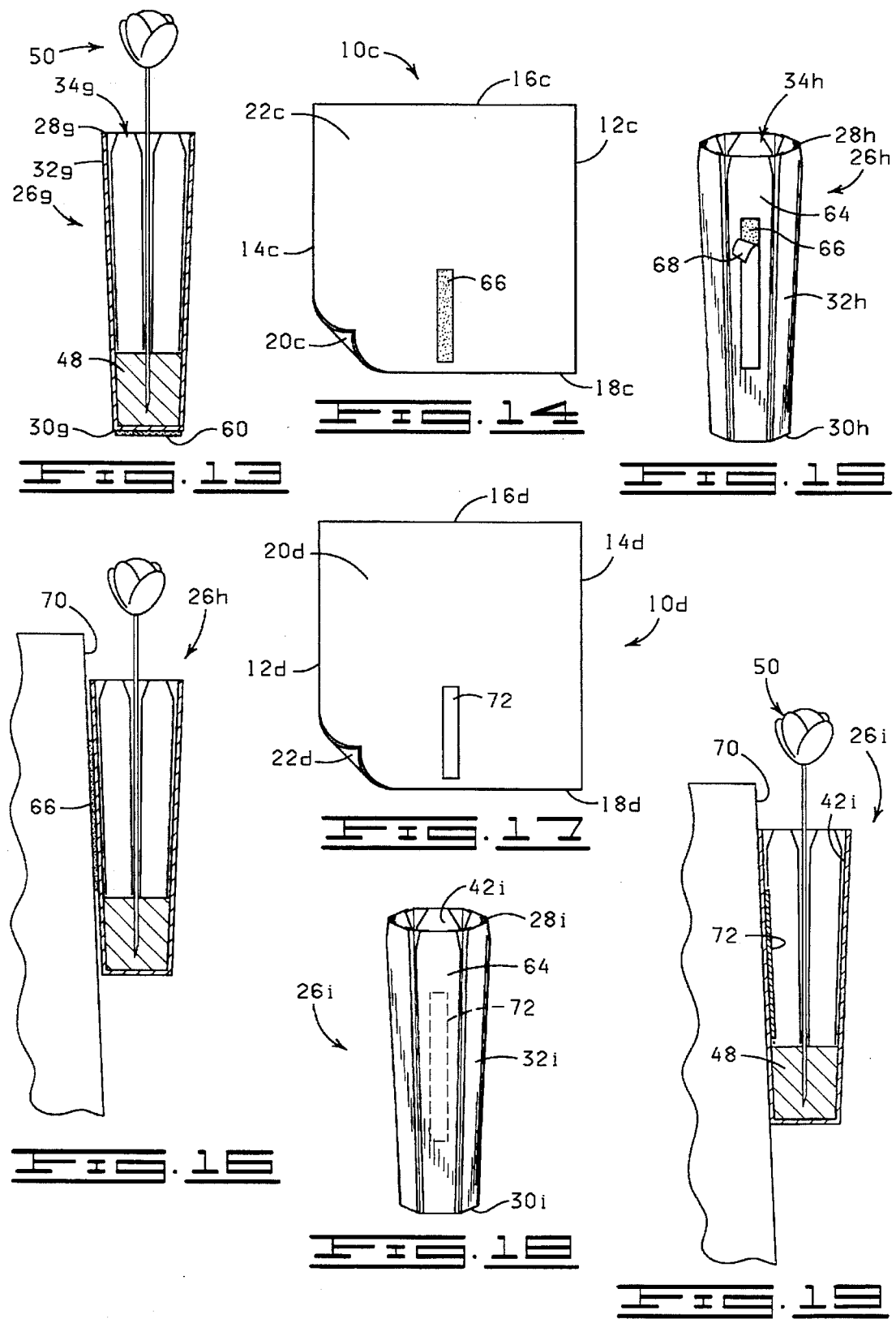

5,662,973

1

VASE FOR CONTAINING A FLORAL GROUPING

RELATED REFERENCES

This application is a continuation-in-part of U.S. Ser. No. 08/108,093, now U.S. Pat. No. 5,472,752, titled ARTICLE FORMING SYSTEM, filed Aug. 17, 1993; which is a continuation of U.S. Ser. No. 08/024,573, now abandoned, titled ARTICLE FORMING SYSTEM, filed Mar. 1, 1993; which is a continuation of U.S. Ser. No. 07/464,694, titled ARTICLE FORMING SYSTEM, filed Jan. 16, 1990, now U.S. Pat. No. 5,208,027; which is a continuation of U.S. Ser. No. 219,083, titled ARTICLE FORMING SYSTEM, filed Jul. 13, 1988, now U.S. Pat. No. 4,897,031; which is a continuation of U.S. Ser. No. 004,275, titled ARTICLE FORMING SYSTEM, filed Jan. 5, 1987, now U.S. Pat. No. 4,773,182; which is a continuation of U.S. Ser. No. 613,080, titled ARTICLE FORMING SYSTEM, filed May 22, 1984, now abandoned.

Said application, U.S. Ser. No. 08/242,583 is also a continuation-in-part of U.S. Ser. No. 868,821, titled, FLAT PANELED FLOWER POT OR FLOWER POT COVER, filed Apr. 14, 1992, now U.S. Pat. No. 5,254,072; which is a continuation of U.S. Ser. No. 736,348, titled, FLAT PANELED FLOWER POT OR FLOWER POT COVER DIE, filed Jul. 26, 1991, now U.S. Pat. No. 5,127,817.

BACKGROUND

The present invention relates to vases formed from sheets of material and more particularly to vases comprised of a sheet made with overlapping folds.

BRIEF DESCRIPTION OF THE DRAWINGS

FIG. 1 is a plan view of a sheet of material constructed for use in accordance with the present invention.

FIG. 2 is a perspective view of a vase constructed from the sheet of material of FIG. 1 in accordance with the present invention.

FIG. 3 is a perspective view of another version of a vase formed in accordance with the present invention.

FIG. 4 is a perspective view of still another version of a vase formed in accordance with the present invention.

FIG. 5 is a perspective view of still another vase formed in accordance with the present invention.

FIG. 6 is a side sectional view of the vase of FIG. 4 having a floral grouping and floral holding material disposed therein.

FIG. 7 is a plan view of another sheet of material constructed for use in accordance with the present invention.

FIG. 8 is a side sectional view of a vase formed using the sheet of material shown in FIG. 7.

FIG. 9 is a plan view of yet another sheet of material constructed for use in accordance with the present invention.

FIG. 10 is a side sectional view of a vase formed using the sheet of material of FIG. 9.

FIG. 11 is a perspective view of another version of a vase formed in accordance with the present invention.

FIG. 12 is a side sectional view of a vase of FIG. 11.

FIG. 13 is a side sectional view of a vase having a shape similar to the vase formed in FIG. 11 but constructed using the sheet of material of FIG. 7.

FIG. 14 is a plan view of a sheet of material constructed in accordance with the present invention and having bonding material thereon.

2

FIG. 15 is a perspective view of a vase constructed from the sheet of material in FIG. 14 in accordance with the method used to form the vase of FIG. 11.

FIG. 16 is a side sectional view of the vase of FIG. 15 showing the vase bondingly engaging a surface.

FIG. 17 is yet another plan view of a sheet of material constructed for use in accordance with the present invention.

FIG. 18 is a vase constructed from the sheet of material of FIG. 17 in accordance with the method used to form the vase of FIG. 11.

FIG. 19 is a side sectional view of the vase of FIG. 18.

DESCRIPTION OF THE PREFERRED EMBODIMENTS

Vases and other similar floral grouping containers which are presently commercially available are rigid, bulky, often heavy and sometimes breakable. There is a need for a vase or floral container which is lightweight, non-breakable, and non-bulky during storage or shipping but which can still function to support a floral grouping in a stable, vertical orientation, and which has a decorative effect. The present invention satisfies such a need. More particularly, the present invention comprises a container for a floral grouping. The container is constructed from a sheet of material formed into a vase having an upper end, a closed lower end having a bottom, an upper end opening, and a peripheral wall extending from the closed lower end to the upper end. The peripheral wall has an outer surface and an inner surface which encompasses and defines an inner space. The bottom of the closed lower end has an outer surface continuous with the outer surface of the peripheral wall and an inner surface continuous with the inner surface of the peripheral wall. The peripheral wall comprises a plurality of folds in the sheet of material with adjacent portions of at least some of the folds being connected via a bonding material to form connected folds, which connected folds cooperate to maintain the vase in the shape of a vase. The container further comprises a bonding material disposed on a portion of the outer surface of the bottom of the vase for enabling the vase to be bondingly connected to a surface in an upright orientation.

The plurality of overlapping folds may comprise a substantial number folds which extend at arbitrary angles to a vertical direction and at arbitrary angles to a horizontal direction and extend over different and arbitrary distances. The container may be constructed from a sheet of material which has a thickness whereby the formed vase is flexible and may be substantially flattened and unflattened to assume the original shape of the formed vase without substantial loss of the preformed shape thereby providing the flexible, yet shape-sustaining nature of the formed vase. The formed vase may include a skirt extending a distance from the upper end thereof. In an alternate version, the plurality of overlapping folds are substantially vertically oriented and are Z-shaped in cross section and the peripheral wall may further comprise a plurality of flat panels which comprise substantially no folds.

The container may further comprise a label disposed thereon. The sheet of the material of the container may further comprise a bonding material for enabling a label, note, card, or other information delivery means to be attached to the sheet of material. Further, the container may comprise a release strip for covering the bonding material prior to use of the bonding material to engage a surface. Additional, as described in more detail below, the vase may be further defined as a bud vase for containing one bud or flower. In another embodiment, the sheet of material used to form the container may comprise a sheet extension which extends from the upper end of the sheet of material after the sheet of material has been formed into a vase, the sheet extension for serving as a protective wrap about a portion of the floral grouping.

In another version, the present invention comprises a plant package made up of a vase such as described above and a floral grouping having an upper end and a lower end, the lower end at least partially disposed within the inner space of the vase and the upper end extending a distance above the upper end of the vase. In another version, the invention comprises a method for packaging a floral grouping for delivery or sale. The method comprises providing a vase as described above, providing a floral grouping having an upper end and a lower end, and disposing at least a portion of the lower end of the floral grouping in the inner space of the vase wherein the upper end extends a distance above the upper end of the vase.

The invention will now be described in more detail. Shown in FIG. 1 and designated by the general reference numeral 10 is a sheet of material having a first outer edge 12, a second outer edge 14, a third outer edge 16, and a fourth outer edge 18, and having an upper surface 20 and a lower surface 22.

The sheet of material 10 may have a thickness in a range of from about 0.1 mils to about 30 mils. Preferably, the sheet of material 10 has a thickness in a range from about 0.2 mils to about 10 mils. More preferably, the sheet of material 10 has a thickness of from about 0.5 mils to about 5 mils.

The sheet of material 10 may be any shape and a square or rectangular shape is shown in FIG. 1 only by way of example. The sheet of material 10, may, for example, be square, rectangular, circular or any other geometric shape such as heart-shaped, or any other shape which enhances the function of the sheet for the purpose disclosed herein.

The sheet of material 10 may be constructed of a single layer of material or a plurality of layers of the same or different types of materials. Any thickness of the sheet of material 10 may be utilized in accordance with the present invention as long as the sheet of material 10 is wrappable about a vase, in particular a bud vase, as described herein. The layers of material comprising the sheet of material 10 may be connected together or laminated or may be separate layers.

The sheet of material 10 may be used in conjunction with a second sheet of material (not shown) which may be sized the same or smaller than the sheet 10. If used, the second sheet of material has a thickness in a range from 0.1 mils to about 30 mils and preferably in a range from about 0.2 mils to about 10 mils. The second sheet of material is flexible, but may be somewhat more rigid compared to the first sheet of material 10.

The sheet of material 10 may further comprise a sheet extension which extends from the upper end of the vase or container after the sheet of material has been formed into a vase wherein the sheet extension (not shown) serves as a protective wrap about the floral grouping the sheet extension may also have a bonding material disposed upon a portion thereof for allowing the sheet extension to be sealed above a floral grouping disposed in the container.

Shown in FIG. 2 is a vase having an upper end 28, a bottom end 30, an outer peripheral surface 32, a plurality of overlapping folds 33, a height 36, an upper diameter 38, and a bottom end diameter 40. The vase 26 may be constructed using a method described in U.S. Pat. No. 4,773,182 which is hereby specifically incorporated herein by reference in its entirety.

Shown in FIG. 3 is a vase exactly the same as the vase of FIG. 2 except for its shape which is cylindrical and which is designated by the general reference numeral 26a. The vase 26a has an upper end 28a, a bottom end 30a, an outer peripheral surface 32a, a plurality of overlapping folds 33a, an upper end opening 34a, a height 36a, an upper diameter 38a, and a lower diameter 40a.

FIG. 4 is yet another version of a vase formed in accordance with the present invention and is designated by the general reference numeral 26b. The vase 26b has an upper end 28b, a bottom end 30b, an outer peripheral surface 32b, a plurality of overlapping folds 33b, an upper end opening 34b, a height 36b, an upper end diameter 38b, and a lower end diameter 40b and is exactly the same as the vase 26 except for its shape, which comprises a bulbous lower end.

By "vase" is meant a vessel, substantially higher than it is wide, which is used to hold a floral grouping or other decoration. Preferably, the height of the vase is generally at least three to five times greater than the narrowest diameter. When used herein the term "bud vase" refers to a vase for holding just one to several cut flowers or buds.

The term "vase" refers to any type of container used for holding a floral grouping or single floral cuttings. It will be appreciated by one of ordinary skill in the art that the vase shapes displayed herein are but a small sample of the great variety of shapes of vases which may be formed to function in accordance with the present invention. "Floral grouping" as used herein means cut fresh flowers, artificial flowers, a single flower either fresh and/or artificial plants or other floral materials and may include other secondary plants and/or ornamentation or artificial or natural materials which add to the aesthetics of the overall floral arrangement. The floral grouping generally comprises a bloom or foliage portion and a stem portion. However, it will be appreciated that the floral grouping may consist of only a single bloom or only foliage (not shown). The term "floral grouping" may be used interchangeably herein with the term "floral arrangement".

The sheet of material 10 and the second sheet of material (if used) may be constructed of a single layer of material or a plurality of layers of the same or different types of materials. Any thickness of the sheet of material 10 may be utilized in accordance with the present invention as long as the sheet of material 10 may be formed into a vase for containing a floral grouping, in the manner described herein. Additionally, an insulating material such as bubble film, preferable as one of two or more layers, can be utilized in order to provide additional protection for the item contained in the vase.

In a preferred embodiment, the sheet of material 10 is constructed from two polypropylene films laminated together (e.g., a polypropylene film such as Mobil 220 AB clear film laminated to a sheet of Mobil 270 ABW white opaque film). The sheet of material 10 is constructed from any suitable wrapping material that is capable of being formed into a vase for containing a floral grouping. Preferably, the sheet of material 10 comprises a paper (untreated or treated in any manner), cellophane, foil, polymer film, fabric (woven or nonwoven or synthetic or natural), burlap, or combinations thereof. The term "polymer film" means a man-made polymer such as a polypropylene or a naturally occurring polymer such as cellophane. A polymer film is relatively strong and not as subject to tearing (substantially non-tearable), as might be the case with paper or foil.

The sheet of material 10 may vary in color. Further, the sheet of material 10 may consist of designs or decorative patterns which are printed, etched, and/or embossed thereon using inks or other printing materials. An example of an ink which may be applied to the surface of the sheet of material 10 is described in U.S. Pat. No. 5,147,706, entitled "Water Based Ink On Foil And/Or Synthetic Organic Polymer", issued to Kingman on Sep. 15, 1992 and which is hereby incorporated herein by reference. In addition, the sheet of material 10 may have various colorings, coatings, flocking and/or metallic finishes, or other decorative surface ornamentation applied separately or simultaneously or may be characterized totally or partially by pearlescent, translucent, transparent, iridescent or the like, qualities. Each of the above-named characteristics may occur alone or in combination and may be applied to the upper and/or lower surface of the sheet of material 10 or to near the upper end 16 or to near the lower end 18 of the sheet 10. Moreover, each surface of the sheet of material 10 may vary in the combination of such characteristics. The sheet of material 10 itself may be opaque, translucent or partially clear or tinted transparent.

The sheet of material 10 may also be constructed in part, from a cling material. "Cling Wrap or Material" when used herein means any material which is capable of connecting to itself upon contacting engagement during the wrapping process and is wrappable about an item whereby portions of the cling material contactingly engage and connect to other portions of another material, or, alternatively, itself, for generally partially forming a portion of a vase.

The cling material is constructed and treated if necessary, from polyethylene such as Cling Wrap made by Glad®, First Brands Corporation, Danbury, Conn. The cling material will range in thickness from less than about 0.1 mils to about 10 mils, and preferably less than about 0.5 mils to about 2.5 mils and most preferably from less than about 0.6 mils to about 2 mils. However, any thickness of cling material may be utilized in accordance with the present invention which permits the cling material to function as described herein.

Shown in FIG. 5 is yet another vase constructed in accordance with the present invention and which is designated by the general reference numeral 26c. The vase 26c is exactly the same as vase 26 except for its shape and has an upper end 28c, a bottom end 30c, an outer peripheral surface 32c, a plurality of overlapping folds 33c, an upper end opening 34c, a height 36c, an upper end diameter 38c, and a lower end diameter 40c. The shape of vase 26c is an inverted version of the shape of vase 26.

Each of the vases 26a through 26c may be constructed in accordance with the method described in U.S. Pat. No. 4,773,182 as noted above.

FIG. 6 shows a side sectional view of the vase 26b of FIG. 4. The side sectional view of the vase 26b reveals an inner peripheral surface 42, a lower inner space 44, an upper inner space 46, a floral holding material 48 which is disposed within the lower inner space 44, a floral grouping 50 which has a bloom end 52, a stem portion 54 and a lower end 56 which is inserted into the floral holding material 48. The floral holding medium (such as foam) 48 disposed within the lower inner space 44 functions to hold a portion of the floral grouping 50, for providing moisture or nutrients, or for providing additional weight to the vase described herein to counterbalance the floral grouping 50. The floral holding medium 48 may further comprise a growing medium for extending the life of the floral grouping 50 disposed within the inner space 44 of the vase 26b. Such floral holding materials 48 are well known to those of ordinary skill in the art and are commercially available. The floral holding material 48 is generally added to the vase after the vase has been constructed.

As noted above, the floral grouping 50 generally comprises a bloom 52 portion and a stem portion 54. Further, the floral grouping 50 may comprise a root portion (not shown) as well. However, it will be appreciated that the floral grouping may consist of only a single bloom or only foliage, or a botanical item (not shown), or a propagule (not shown). The term "floral grouping" may also be used interchangeably herein with the terms "botanical item" and/or "propagule".

The term "growing medium" when used herein means any liquid, solid or gaseous material used for plant growth or for the cultivation of propagules, including organic and inorganic materials such as soil, humus, perlite, vermiculite, sand, water and including the nutrients, fertilizers or hormones or combinations thereof required by the plants or propagules for growth.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule" when used herein means any structure capable of being propagated or acting as an agent of reproduction including seeds, shoots, stems, runners, tubers, plants, leaves, roots or spores.

FIG. 7 shows an alternate version of the sheet of material used in accordance with the present invention and which is designated by the general reference numeral 10a. Sheet 10a has a first outer edge 12a, a second outer edge 14a, a third outer edge 16a, a fourth outer edge 18a, an upper surface 20a, and a lower surface 22a. The sheet 10a is exactly the same as the sheet 10 except the sheet 10a further has an area of bonding material 60 which is disposed upon a portion of the lower surface 22a. Although the bonding material 60 is shown in FIG. 7 as comprising a continuous circle, the bonding material may instead be disposed upon the sheet of material 10a in any other geometric form or pattern including circles, stripes, spots, or designs. One method for disposing a bonding material on the sheet of material, in this case an adhesive or cohesive, is described in U.S. Pat. No. 5,111,637, entitled "Method For Wrapping A Floral Grouping", issued to Weder et al., on May 12, 1992 and which is hereby incorporated herein by reference.

The term "bonding material or bonding means" when used herein means an adhesive, frequently a pressure sensitive adhesive, or a cohesive. When the bonding material is a cohesive, a similar cohesive material must be present on the surface which the vase will be disposed on to be bondingly contacted and bondingly connected with the cohesive material.

Shown in FIG. 8 is a cross section of a vase designated by the general reference numeral 26d. Vase 26d is exactly the same as the vase 26b but is formed from the sheet of material 10a. The vase 26d is shown in the side sectional view as having a lower inner space 44, a bottom end 30d, a floral holding material 48, and a floral grouping 50 and further having an area of bonding material 60 disposed on the bottom end 30d. The bonding material 60 enables the vase 26d to be bondingly adhered to a surface, thereby anchoring the vase 26d so it will remain in a vertical position even when containing a floral grouping 50.

FIG. 9 shows another version of the sheet of material designated by the general reference numeral 10b and which is exactly the same as the sheet 10 except for the differences described herein. Sheet 10b has a first outer edge 12b, a second outer edge 14b, a third outer edge 16b, a fourth outer edge 18b, an upper surface 20b, and a lower surface 22b.

Shown disposed on the upper surface 20b of the sheet 10b is an area of heavier or denser material 62. The area of heavier or denser material 62 is preferably disposed in the portion of the sheet 10b which is destined to become part of the bottom end of a vase constructed therefrom. The material 62 may be wire, metal, an area of denser sheet material or even a magnetic material, or a material having magnetic properties.

Shown in FIG. 10 is a vase which is exactly the same as vase 26b except it is constructed from the sheet of material 10b of FIG. 9 and is designated by the general reference numeral 26e. The vase 26e has a bottom end 30e, a lower interior space 44, a floral holding material 48 disposed within the lower interior space 44, and a floral grouping 50 disposed therein. The area of denser material 62 is shown disposed against the bottom 30e and below the floral holding material 48. The area of denser material 62 serves to make the bottom end 30e more stable thus making the vase 26e less top heavy when a floral grouping 50 is disposed therein. If the area of denser material 62 is magnetic or has magnetic properties, it can serve to anchor the bottom end 30e of the vase 26e to a metal surface having magnetic properties.

Shown in FIG. 11 is a alternate version of a vase constructed in accordance with the present invention and which is designated by the general reference numeral 26f. The vase 26f has an upper end 28f, a bottom end 30f, an outer peripheral surface 32f, an upper opening 34f, a height 36f, an upper end diameter 38f, and a lower end diameter 40f. The vase 26f further comprises a plurality of vertical flat panels 64. The vase 26f also has a plurality of vertical overlapping folds which are generally adjacent or parallel to the vertical flat panels and which are Z-shaped in cross-section. The vertical flat panels 64 have virtually no folds therein. The vase 26f may be constructed using a method such as that described in U.S. Pat. No. 5,176,609, the specification of which is hereby specifically incorporated herein by reference.

FIG. 12 shows a side sectional view of the vase 26f of FIG. 11. The vase 26f has an interior surface 42f, a lower interior space 44f, an upper interior space 46f, a floral holding material 48 disposed within the lower interior space 44f, and a floral grouping 50 which has a bloom end 52, a stem portion 54, and a lower end 56 which is disposed in the floral holding material 48. The vase 26f is constructed from a sheet of material such as the sheet of material 10 shown in FIG. 1.

FIG. 13 shows an alternate version of a vase which is exactly the same as the vase 26f in FIG. 11 except for the differences noted here and which is designated by the general reference numeral 26g. The vase 26g has an upper end 28g, a bottom end 30g, an outer peripheral surface 32g, and an upper opening 34g, and is exactly the same as the vase 26f except it has a bonding material 60 disposed on the outer surface of the bottom end 30g. Vase 26g could thus be bondingly connected to a surface in the same manner as vase 26d described above.

FIG. 14 shows a sheet of material constructed in accordance with the present invention and which is designated by the general reference numeral 10c. The sheet 10c is exactly the same as sheet 10 except for the differences described here. The sheet 10c has a first outer edge 12c, a second outer edge 14c, a third outer edge 16c, a fourth outer edge 18c, an upper surface 20c and a lower surface 22c. Disposed on the lower surface 22c is a strip of bonding material 66. The sheet of material 10c may be used to construct a vase in accordance with the present invention such as the flat panel vase shown in FIG. 15 which is designated by the general reference numeral 26h and which is exactly the same as the vase 26f except for the sheet from which it is constructed.

The vase 26h has an upper end 28h, a bottom end 30h, an outer peripheral surface 32h, an upper opening 34h, and a plurality of vertical flat panels 64. The vase 26h further comprises a strip of bonding material 66 which is exposed on the outer surface of at least one of the vertical flat panels 64 for allowing the vase 26h to be bondingly connected to a surface in a vertical orientation.

Also shown in vase 26h of FIG. 15 is a release strip 68 which covers the surface of the bonding material 66 and which can be removed from the bonding material 66 as indicated in FIG. 15 to expose the bonding material 66 for bondingly connecting to a surface when desired.

Shown in FIG. 16 in side sectional view is the vase 26h bonded by the adhesive material 66 to a surface 70 in a vertical orientation.

Shown in FIG. 17 is yet another alternate version of the sheet of material as described herein which is designated by the general reference numeral 10d. The sheet 10d is exactly the same as sheet 10 except for the differences described herein. The sheet of material 10d has a first outer edge 12d, a second outer edge 14d, a third outer edge 16d, and a fourth outer edge 18d. The sheet 10d further has a upper surface 20d and a lower surface 22d. Disposed upon a portion of the upper surface 20d is a magnetic strip 72d which is connected to a portion of the upper surface 20d. An example of a magnetic strip is that which is commercially available and which has an adhesive backing for attaching to a surface.

Shown in FIG. 18 is a vase constructed from the sheet of material 10d and which is designated by the general reference numeral 26i. The vase 26i is exactly the same as vase 26f except for the differences noted here. The vase 26i has an upper end 28i, a bottom end 30i, an outer peripheral surface 32i, and an inner peripheral surface 42i. Also indicated is the magnetic strip 72 which is disposed upon a portion of the inner surface 42i and which extends at least partially along the length of one panel 64.

Shown in FIG. 19 is a side sectional view of a vase 26i which is magnetically connected to a magnetically adhering surface 70 via the magnetic strip 72 disposed on or in the vase 26i.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A container for a floral grouping, comprising: a sheet of material formed into a vase, the vase comprising an upper end, a closed lower end having a bottom, an upper end opening, and a peripheral wall extending from the closed lower end to the upper end, the peripheral wall having an outer surface and an inner surface which encompasses and defines an inner space and wherein the bottom of the closed lower end has an outer surface continuous with the outer surface of the peripheral wall and an inner surface continuous with the inner surface of the peripheral wall, and wherein the peripheral wall comprises a plurality of folds in the sheet of material with adjacent portions of at least some of the folds being connected via a bonding material to form connected folds, which connected folds cooperate to maintain the vase in the shape of a vase; and a bonding material disposed on a portion of the outer surface of the bottom of the vase for enabling the vase to be bondingly connected to a surface in a vertical orientation.

2. The container of claim 1 wherein the plurality of overlapping folds comprise a substantial number folds which extend at arbitrary angles to a vertical direction and at arbitrary angles to a horizontal direction and extend over different and arbitrary distances.

3. The container of claim 1 wherein the sheet of material is defined further as being constructed of a material and having a thickness whereby the formed vase is flexible and may be substantially flattened and unflattened to assume the original shape of the formed vase without substantial loss of the preformed shape thereby providing the flexible, yet shape-sustaining nature of the formed vase.

4. The container of claim 1 wherein the sheet of material is defined further as being shaped whereby the formed vase includes a skirt extending a distance from the upper end thereof.

5. The container of claim 1 wherein the plurality of overlapping folds are substantially vertically oriented and are Z-shaped in cross section and wherein the peripheral wall further comprises a plurality of flat panels which comprise substantially no folds.

6. The container of claim 1 wherein the sheet of material is defined further as being constructed of a polymer film.

7. The container of claim 1 wherein the sheet of material is defined further as having a thickness in a range from less than about 0.1 mils to about 30 mils.

8. The container of claim 1 wherein the sheet of material is defined further as having a thickness in a range from less than about 0.2 mils to about 10 mils.

9. The container of claim 1 wherein the sheet of material is defined further as having a thickness in a range from less than about 0.5 mils to about 5 mils.

10. The container of claim 1 wherein the sheet of material further comprises a label disposed thereon.

11. The container of claim 1 wherein the sheet of material further comprises a bonding material for enabling a label, note, card, or other information delivery means to be attached to the sheet of material.

12. The container of claim 1 further comprising a release strip for covering the bonding material prior to use of the bonding material to engage a surface.

13. The container of claim 1 wherein the sheet of material is selected from the group consisting of a paper (untreated or treated in any manner), cellophane, foil, fabrics (woven or nonwoven, synthetic or natural), burlap, or combinations thereof.

14. The container of claim 1 wherein the vase is further defined as a bud vase for containing one bud or flower.

15. The container of claim 1 wherein the bonding material is further defined as an adhesive or cohesive.

16. The container of claim 1 wherein the sheet of material further comprises a sheet extension which extends from the upper end of the sheet of material after the sheet of material has been formed into a vase, the sheet extension for serving as a protective wrap about a portion of the floral grouping.

17. A plant package, comprising:

a vase formed from a sheet of material, the vase comprising an upper end, a closed lower end having a bottom, an upper end opening, and a peripheral wall extending from the closed lower end to the upper end, the peripheral wall having an outer surface and an inner surface which encompasses and defines an inner space and wherein the bottom of the closed lower end has an outer surface continuous with the outer surface of the peripheral wall and an inner surface continuous with the inner surface of the peripheral wall, and wherein the peripheral wall comprises a plurality of folds in the sheet of material with adjacent portions of at least some of the folds being connected via a bonding material to form connected folds, which connected folds cooperate to maintain the vase in the shape of a vase, the vase further comprising a bonding material disposed on a portion of the outer surface of the bottom thereof for enabling the vase to be bondingly connected to a surface in a vertical orientation; and a floral grouping having an upper end and a lower end, the lower end at least partially disposed within the inner space of the vase and the upper end extending a distance above the upper end of the vase.

18. The plant package of claim 17 wherein the plurality of overlapping folds comprise a substantial number folds which extend at arbitrary angles to a vertical direction and at arbitrary angles to a horizontal direction and extend over different and arbitrary distances.

19. The plant package of claim 17 wherein the sheet of material is defined further as being constructed of a material and having a thickness whereby the formed vase is flexible and may be substantially flattened and unflattened to assume the original shape of the formed vase without substantial loss of the preformed shape thereby providing the flexible, yet shape-sustaining nature of the formed vase.

20. The plant package of claim 17 wherein the sheet of material is defined further as being shaped whereby the formed vase includes a skirt extending a distance from the upper end thereof.

21. The plant package of claim 17 wherein the plurality of overlapping folds are substantially vertically oriented and are Z-shaped in cross section and wherein the peripheral wall further comprises a plurality of flat panels which comprise substantially no folds.

22. The plant package of claim 17 wherein the sheet of material is defined further as being constructed of a polymer film.

23. The plant package of claim 17 wherein the sheet of material is defined further as having a thickness in a range from less than about 0.1 mils to about 30 mils.

24. The plant package of claim 17 wherein the sheet of material is defined further as having a thickness in a range from less than about 0.2 mils to about 10 mils.

25. The plant package of claim 17 wherein the sheet of material is defined further as having a thickness in a range from less than about 0.5 mils to about 5 mils.

26. The plant package of claim 17 wherein the sheet of material further comprises a label disposed thereon.

27. The plant package of claim 17 wherein the sheet of material further comprises a bonding material for enabling a label, note, card, or other information delivery means to be attached to the sheet of material.

28. The plant package of claim 17 further comprising a release strip for covering the bonding material prior to use of the bonding material to engage a surface.

29. The plant package of claim 17 wherein the sheet of material is selected from the group consisting of a paper (untreated or treated in any manner), cellophane, foil, fabrics (woven or nonwoven, synthetic or natural), burlap, or combinations thereof.

30. The plant package of claim 17 wherein the vase is further defined as a bud vase for containing one bud or flower.

31. The plant package of claim 17 wherein the bonding material is further defined as an adhesive or cohesive.

32. The plant package of claim 17 wherein the sheet of material further comprises a sheet extension which extends from the upper end of the sheet of material after the sheet of material has been formed into a vase, the sheet extension for serving as a protective wrap about a portion of the floral grouping.

33. A method for packaging a floral grouping for delivery or sale, comprising:

providing a vase formed from a sheet of material, the vase comprising an upper end, a closed lower end having a bottom, an upper end opening, and a peripheral wall extending from the closed lower end to the upper end, the peripheral wall having an outer surface and an inner surface which encompasses and defines an inner space and wherein the bottom of the closed lower end has an outer surface continuous with the outer surface of the peripheral wall and an inner surface continuous with the inner surface of the peripheral wall, and wherein the peripheral wall comprises a plurality of folds in the sheet of material with adjacent portions of at least some of the folds being connected via a bonding material to form connected folds, which connected folds cooperate to maintain the vase in the shape of a vase, the vase further comprising a bonding material disposed on a portion of the outer surface of the bottom thereof for enabling the vase to be bondingly connected to a surface in a vertical orientation;

providing a floral grouping having an upper end and a lower end; and disposing at least a portion of the lower end of the floral grouping in the inner space of the vase wherein the upper end extends a distance above the upper end of the vase.

34. The method of claim 33 wherein in the step of providing a vase the plurality of overlapping folds comprise a substantial number folds which extend at arbitrary angles to a vertical direction and at arbitrary angles to a horizontal direction and extend over different and arbitrary distances.

35. The method of claim 33 wherein in the step of providing a vase the sheet of material is defined further as being constructed of a material and having a thickness whereby the formed vase is flexible and may be substantially flattened and unflattened to assume the original shape of the formed vase without substantial loss of the preformed shape thereby providing the flexible, yet shape-sustaining nature of the formed vase.

36. The method of claim 33 wherein in the step of providing a vase the sheet of material is defined further as being shaped whereby the formed vase includes a skirt extending a distance from the upper end thereof.

37. The method of claim 33 wherein in the step of providing the vase, the plurality of overlapping folds are substantially vertically oriented and are Z-shaped in cross section and wherein the peripheral wall further comprises a plurality of flat panels which comprise substantially no folds.

38. The method of claim 33 wherein in the step of providing a vase the sheet of material is defined further as being constructed of a polymer film.

39. The method of claim 33 wherein in the step of providing a vase the sheet of material is defined further as having a thickness in a range from less than about 0.1 mils to about 30 mils.

40. The method of claim 33 wherein in the step of providing a vase the sheet of material is defined further as having a thickness in a range from less than about 0.2 mils to about 10 mils.

41. The method of claim 33 wherein in the step of providing a vase the sheet of material is defined further as having a thickness in a range from less than about 0.5 mils to about 5 mils.

42. The method of claim 33 wherein in the step of providing a vase the sheet of material further comprises a label disposed thereon.

43. The method of claim 33 wherein in the step of providing a vase the sheet of material further comprises a bonding material for enabling a label, note, card, or other information delivery means to be attached to the sheet of material.

44. The method of claim 33 wherein the step of providing the vase, the sheet of material, further comprises a release strip for covering the bonding material prior to use of the bonding material to engage a surface.

45. The method of claim 33 wherein in the step of providing a vase the sheet of material is selected from the group consisting of a paper (untreated or treated in any manner), cellophane, foil, fabrics (woven or nonwoven, synthetic or natural), burlap, or combinations thereof.

46. The method of claim 33 wherein in the step of providing a vase the vase is further defined as a bud vase for containing one bud or flower.

47. The method of claim 33 wherein in the step of providing a vase the bonding material is further defined as an adhesive or cohesive.

48. The method of claim 33 wherein in the step of providing a vase the sheet of material further comprises a sheet extension which extends from the upper end of the sheet of material after the sheet of material has been formed into a vase, the sheet extension for serving as a protective wrap about a portion of the floral grouping.

* * * * *

UNITED STATES PATENT AND TRADEMARK OFFICE
CERTIFICATE OF CORRECTION

PATENT NO. : 5,662,973                                      Page 1 of 5

DATED : September 2, 1997

INVENTOR(S) : Donald E. Weder

It is certified that error appears in the above-identified patent and that said Letters Patent is hereby corrected as shown below:

On the title page, under Related U.S. Application Data [63], line 8, please delete "May 19", and substitute therefor --May 22--.

Cover Sheet, under [56] References Cited, U.S. PATENT DOCUMENTS, please insert the following:

| | | | |
|---|---|---|---|
| -- 254,659 | 4/1980 | Karotseris | D11/143 |
| 557,526 | 3/1896 | Egge | 156/212 |
| 732,889 | 7/1903 | Paver | 229/82 |
| 920,313 | 5/1909 | Franklin | 220/491 |
| 1,069,675 | 8/1913 | Claussen | 229/400 |
| 1,102,499 | 7/1914 | Haist | 383/33 |
| 1,446,563 | 2/1923 | Hughes | 47/72 |
| 1,525,015 | 2/1925 | Weeks | 53/499 |
| 1,863,216 | 6/1032 | Wordingham | 206/284 |
| 1,868,853 | 7/1932 | Sievers | 47/72 |
| 1,978,631 | 10/1934 | Herrlinger | 91/68 |
| 2,048,123 | 7/1936 | Howard | 229/87 |
| 2,170,147 | 8/1939 | Lane | 206/56 |
| 2,204,664 | 6/1940 | Clark | 18/56 |
| 2,239,398 | 5/1941 | Palmer | 229/14 |
| 2,260,230 | 10/1941 | Olson | 206/44 |
| 2,278,673 | 4/1942 | Savada et al. | 154/43 |

UNITED STATES PATENT AND TRADEMARK OFFICE
CERTIFICATE OF CORRECTION

PATENT NO. : 5,662,973

DATED : September 2, 1997

INVENTOR(S) : Donald E. Weder

It is certified that error appears in the above-identified patent and that said Letters Patent is hereby corrected as shown below:

| | | | |
|---|---|---|---|
| 2,302,259 | 11/1942 | Rothfuss | 41/10 |
| 2,335,559 | 8/1944 | Renner | 229/8 |
| 2,367,749 | 1/1945 | Barbieri | 93/60 |
| 2,371,985 | 3/1945 | Freiberg | 206/46 |
| 2,411,328 | 11/1946 | MacNab | 33/12 |
| 2,458,246 | 1/1949 | Brereton | 220/84 |
| 2,482,981 | 9/1949 | Kamrass | 41/13 |
| 2,510,120 | 6/1950 | Leander | 117/122 |
| 2,529,060 | 11/1950 | Trillich | 117/68.5 |
| 2,544,075 | 3/1951 | Ernst et al. | 150/49 |
| 2,573,770 | 11/1951 | Meadow | 150/28 |
| 2,621,142 | 12/1952 | Wetherell | 154/117 |
| 2,622,380 | 12/1952 | Snyder | 53/15 |
| 2,780,401 | 2/1957 | Stevens | 229/2.5 |
| 2,822,287 | 2/1958 | Avery | 117/14 |
| 2,845,735 | 8/1958 | Werner | 41/10 |
| 2,846,060 | 8/1958 | Yount | 206/58 |
| 2,883,262 | 4/1959 | Borin | 21/56 |
| 2,967,652 | 1/1961 | Canfield | 229/5.5 |
| 3,013,689 | 12/1961 | Shropshire | 215/100.5 |
| 3,022,605 | 2/1962 | Reynolds | 47/58 |
| 3,113,712 | 12/1963 | Kindseth | 229/14 |
| 3,121,647 | 2/1964 | Harris et al. | 118/202 |
| 3,130,113 | 4/1964 | Silman | 161/97 |

UNITED STATES PATENT AND TRADEMARK OFFICE
CERTIFICATE OF CORRECTION

PATENT NO. : 5,662,973

DATED : September 2, 1997

INVENTOR(S) : Donald E. Weder

It is certified that error appears in the above-identified patent and that said Letters Patent is hereby corrected as shown below:

| | | | |
|---|---|---|---|
| 3,148,799 | 9/1964 | Meroney | 220/63 |
| 3,189,502 | 6/1964 | Little | 156/210 |
| 3,215,330 | 11/1965 | Thomas | 229/14 |
| 3,271,922 | 9/1966 | Wallerstein | 53/3 |
| 3,318,748 | 5/1967 | Hurst | 154/224 |
| 3,466,214 | 9/1969 | Polk | 156/213 |
| 3,488,022 | 1/1970 | Vittori | 248/152 |
| 3,508,372 | 4/1970 | Wallerstein | 53/3 |
| 3,514,012 | 5/1970 | Martin | 220/63 |
| 3,542,616 | 11/1970 | Cain et al. | 156/224 |
| 3,620,366 | 11/1971 | Parkinson | 206/59c |
| 3,681,105 | 8/1972 | Milutin | 117/15 |
| 3,757,990 | 9/1973 | Buth | 220/63R |
| 3,775,932 | 12/1973 | Jeney | 53/22 |
| 3,791,902 | 2/1974 | Hanke et al. | 156/212 |
| 3,927,821 | 12/1975 | Dunning | 229/14 |
| 3,962,503 | 6/1976 | Crawford | 428/40 |
| 4,043,077 | 8/1977 | Stonehocker | 47/66 |
| 4,054,697 | 10/1977 | Reed et al. | 428/40 |
| 4,118,890 | 10/1978 | Shore | 47/28 |
| 4,170,618 | 10/1979 | Adams | 264/101 |
| 4,216,620 | 8/1980 | Weder et al. | 47/72 |
| 4,300,312 | 11/1981 | Weder et al. | 47/72 |
| 4,333,267 | 6/1982 | Witte | 47/84 |

UNITED STATES PATENT AND TRADEMARK OFFICE
CERTIFICATE OF CORRECTION

PATENT NO. : 5,662,973

DATED : September 2, 1997

INVENTOR(S) : Donald E. Weder

It is certified that error appears in the above-identified patent and that said Letters Patent is hereby corrected as shown below:

| | | | |
|---|---|---|---|
| 4,379,101 | 5/1983 | Smith | 264/403 |
| 4,380,564 | 5/1983 | Cancio et al. | 428/167 |
| 4,413,725 | 11/1983 | Bruno et al. | 206/45.33 |
| 4,546,875 | 10/1985 | Zweber | 206/0.82 |
| 4,508,223 | 4/1985 | Catrambone | 206/423 |
| 4,733,521 | 3/1988 | Weder et al. | 53/580 |
| 4,765,464 | 8/1988 | Ristvedt | 206/0.82 |
| 5,111,638 | 5/1992 | Weder | 53/397-- |

Cover Sheet, under [56] References Cited, FOREIGN PATENT DOCUMENTS, please insert the following:

-- 560,532    4/1975    Switzerland
   2,610,604  8/1988    France--

Cover Sheet, under [56] References Cited, at the end of the FOREIGN PATENT DOCUMENTS, please insert the following:

--OTHER PUBLICATIONS

Exhibit A - The Simple Solution For Those Peak Volume Periods, Speed Cover® 1989©, 6 pages, a brochure published by Highland Supply, 1111 Sixth St., Highland, IL 62249.

UNITED STATES PATENT AND TRADEMARK OFFICE
CERTIFICATE OF CORRECTION

PATENT NO. : 5,662,973
DATED : September 2, 1997
INVENTOR(S) : Donald E. Weder

It is certified that error appears in the above-identified patent and that said Letters Patent is hereby corrected as shown below:

Exhibit B - "A World of Cut Flower and Pot Plant Packaging," Klerk's Plastic Products Manufacturing Inc. Brochure, date unknown, 6 pages. Applicant admits that the products described in this brochure have been on sale at least more than one year prior to the filing of the present patent application.

Exhibit C - "Speed Sheets® And Speed Rolls®," ©1990, 2 pages, a brochure published by Highland Supply, 1111 Sixth St., Highland, IL 62249.--

Cover page, under [57] ABSTRACT, line 1, after 'The', please insert --container,--.

Signed and Sealed this

Second Day of December,1997

Attest:

BRUCE LEHMAN

Attesting Officer

Commissioner of Patents and Trademarks